(12) United States Patent
Zeller et al.

(10) Patent No.: US 9,931,689 B2
(45) Date of Patent: Apr. 3, 2018

(54) MANUFACTURE OF A ROTOR BLADE FOR A WIND TURBINE

(75) Inventors: Lenz Simon Zeller, Kiel (DE); Maik Gunther, Bad Frankenhausen (DE)

(73) Assignee: Senvion SE, Hamburg (DE)

( * ) Notice: Subject to any disclaimer, the term of this patent is extended or adjusted under 35 U.S.C. 154(b) by 921 days.

(21) Appl. No.: 13/822,703

(22) PCT Filed: Oct. 5, 2011

(86) PCT No.: PCT/EP2011/004964
§ 371 (c)(1),
(2), (4) Date: Aug. 22, 2013

(87) PCT Pub. No.: WO2012/048813
PCT Pub. Date: Apr. 19, 2012

(65) Prior Publication Data
US 2014/0003953 A1 Jan. 2, 2014

(30) Foreign Application Priority Data

Oct. 12, 2010 (DE) ......................... 10 2010 042 327

(51) Int. Cl.
*F03D 1/06* (2006.01)
*B29C 33/12* (2006.01)
(Continued)

(52) U.S. Cl.
CPC ................ *B21K 3/04* (2013.01); *F03D 1/065* (2013.01); *F03D 1/0675* (2013.01); *B29C 65/542* (2013.01); *B29C 66/112* (2013.01); *B29C 66/114* (2013.01); *B29C 66/1162* (2013.01); *B29C 66/131* (2013.01); *B29C 66/301* (2013.01); *B29C 66/3242* (2013.01);
(Continued)

(58) Field of Classification Search
CPC ......... F03D 1/0675; F03D 1/065; B21K 3/04; B29C 70/546; B29C 65/542; B29C 66/54; B29C 66/836; B29C 66/112; B29C 66/114; Y10T 29/49336; F16B 11/006; B29L 2031/085; Y02E 10/721; Y02P 70/523
USPC ...................................................... 416/223 R
See application file for complete search history.

(56) References Cited

U.S. PATENT DOCUMENTS 5,042,688 A * 8/1991 Srivastava .......... B05C 11/1034
118/300
7,179,059 B2 2/2007 Sorensen
(Continued)

FOREIGN PATENT DOCUMENTS

WO 2010/023140 3/2010

*Primary Examiner* — Mark Laurenzi
*Assistant Examiner* — Anthony Ayala Delgado
(74) *Attorney, Agent, or Firm* — Rankin, Hill & Clark, LLP

(57) ABSTRACT

A method and manufacturing unit for producing a rotor blade (5) of a wind turbine (1) from at least a first rotor blade element (11, 11', 12, 12') and a second rotor blade element (11, 11', 12, 12'). The first rotor blade element (11, 11', 12, 12') and the second rotor blade element (11, 11', 12, 12') are positioned in the desired relative arrangement with respect to each other such that a joint gap (13) remains between the first rotor blade element (11, 11', 12, 12') and the second rotor blade element (11, 11', 12, 12'). Adhesive is introduced into the joint gap (13) for joining the first rotor blade element (11, 11', 12, 12') and the second rotor blade element (11, 11', 12, 12').

8 Claims, 3 Drawing Sheets

Figure 1:
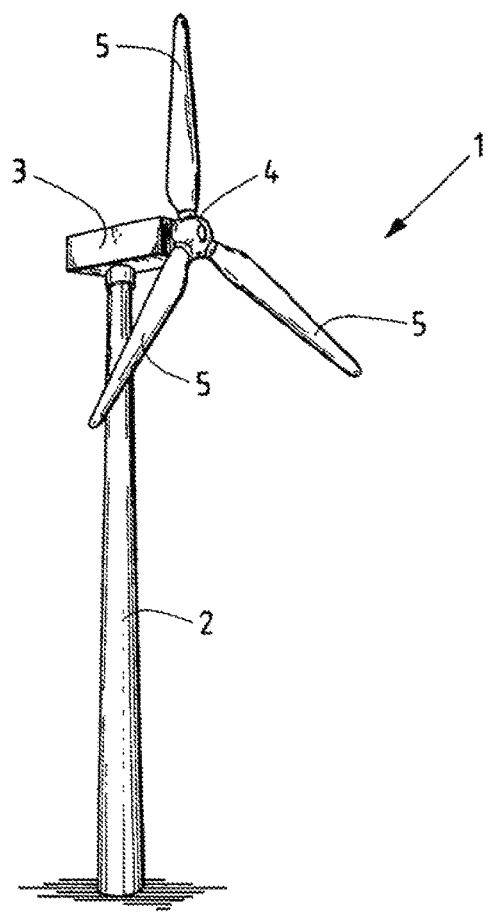

(51) Int. Cl.
*B29C 70/44* (2006.01)
*B29C 70/88* (2006.01)
*B21K 3/04* (2006.01)
*B29C 65/54* (2006.01)
*B29C 65/00* (2006.01)
*B29L 31/08* (2006.01)
*F16B 11/00* (2006.01)

(52) U.S. Cl.
CPC ...... *B29C 66/43441* (2013.01); *B29C 66/532* (2013.01); *B29C 66/5326* (2013.01); *B29C 66/54* (2013.01); *B29C 66/61* (2013.01); *B29C 66/836* (2013.01); *B29L 2031/085* (2013.01); *F16B 11/006* (2013.01); *Y02E 10/721* (2013.01); *Y02P 70/523* (2015.11); *Y10T 29/49336* (2015.01)

(56) References Cited

U.S. PATENT DOCUMENTS

| | | | |
|---|---|---|---|
| 7,824,592 B2 * | 11/2010 | van Breugel | B29C 65/542 264/263 |
| 7,895,746 B2 * | 3/2011 | Bech | B29C 66/1312 29/889.21 |
| 9,168,705 B2 * | 10/2015 | Bendel | B29C 66/721 |
| 9,181,923 B2 * | 11/2015 | Grabau | B29C 33/12 |
| 2006/0003096 A1 * | 1/2006 | Hartmann | H01L 21/67132 427/207.1 |
| 2008/0075603 A1 | 3/2008 | Van Breugel | |
| 2010/0132884 A1 | 6/2010 | Baehmann | |
| 2011/0126978 A1 * | 6/2011 | Gau | B29D 99/0028 156/305 |

* cited by examiner

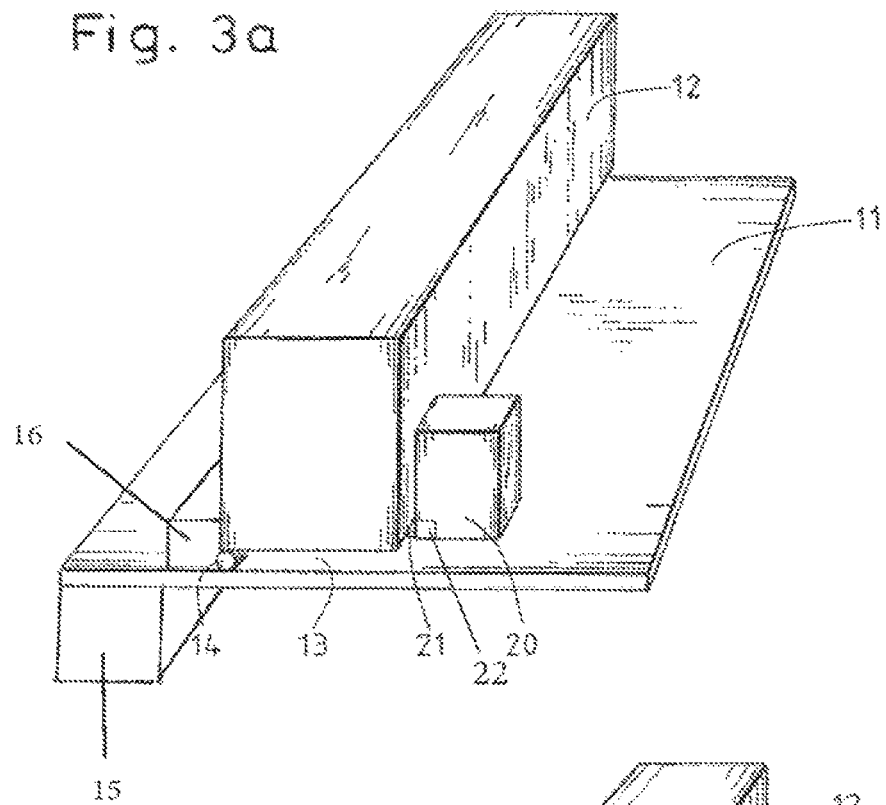
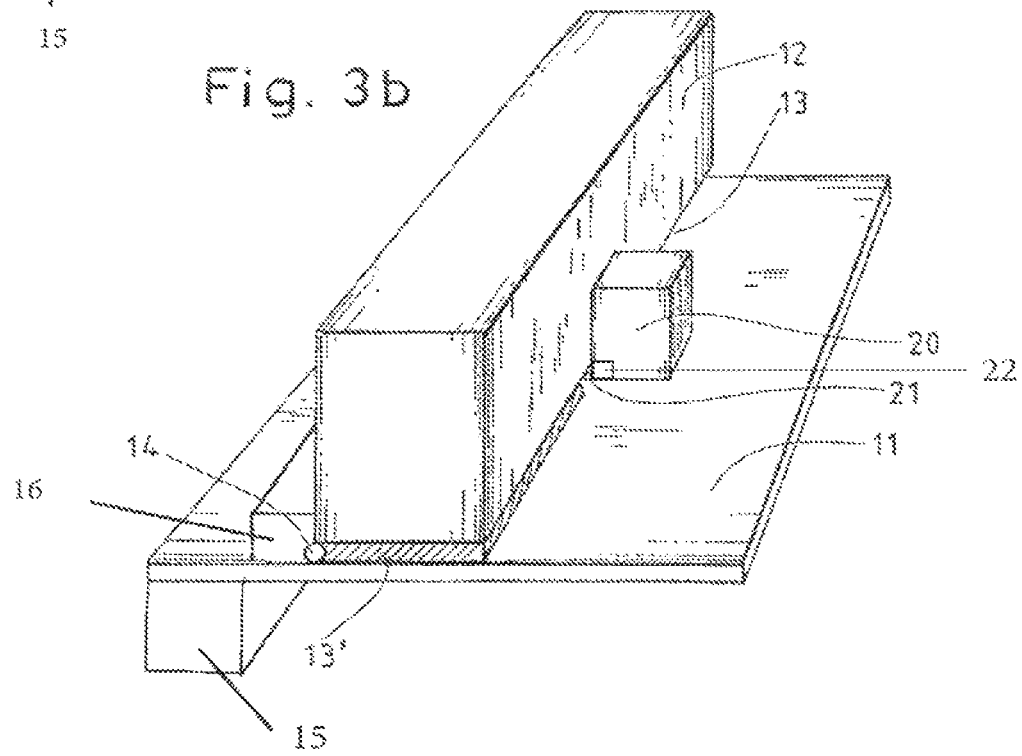

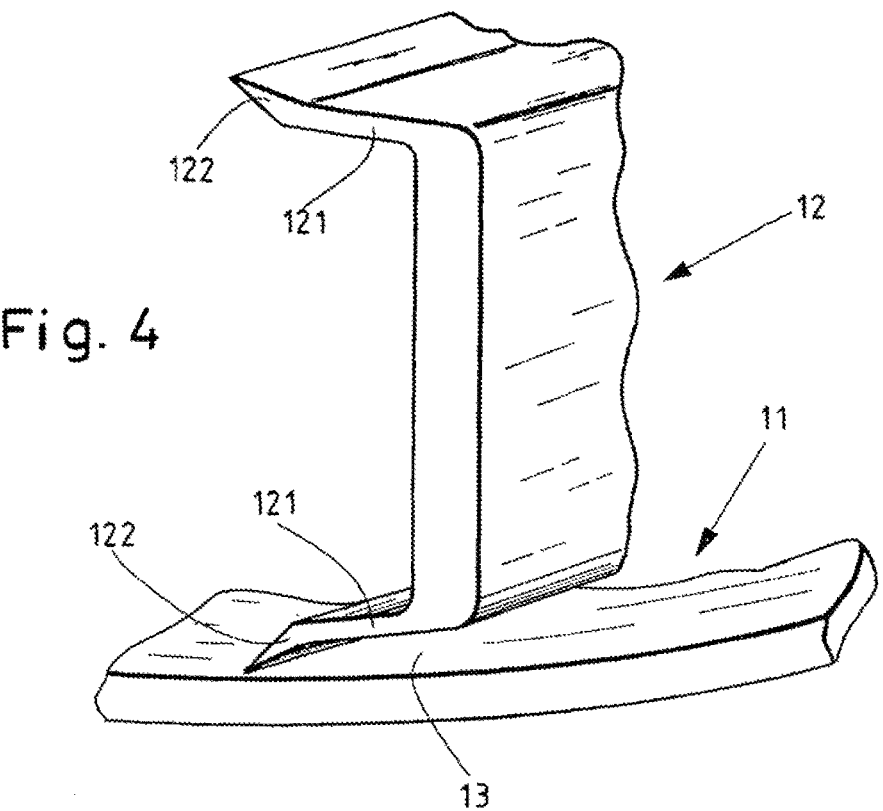
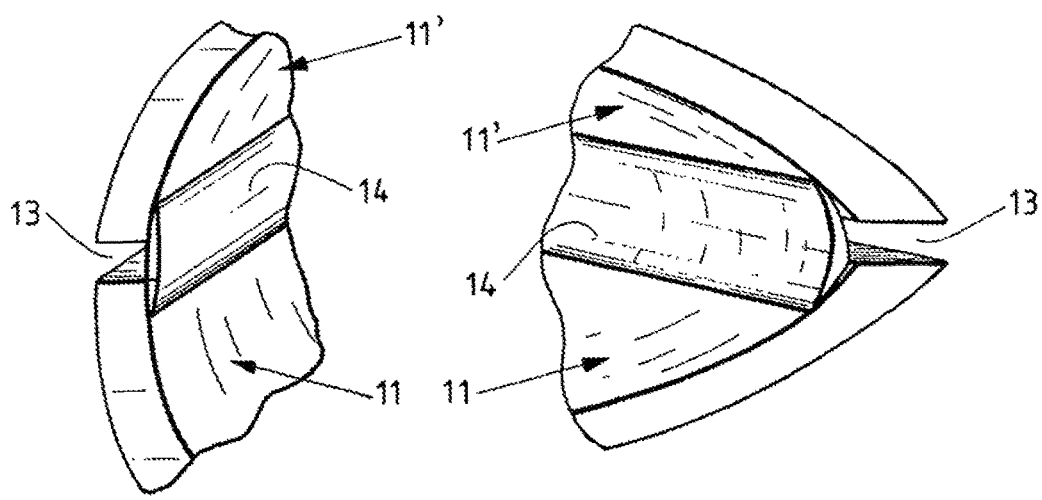

MANUFACTURE OF A ROTOR BLADE FOR A WIND TURBINE

The invention relates to a method for manufacturing a rotor blade of a wind turbine from at least a first rotor blade element and a second rotor blade element. The invention further relates to a manufacturing unit for joining a first rotor blade element and a second rotor blade element during the production of a rotor blade of a wind turbine, having a first positioning device for the first rotor blade element and a second positioning device for the second rotor blade element. In addition, the invention relates to a rotor blade for a wind turbine having at least a first rotor blade element and a second rotor blade element and a wind turbine.

Rotor blades for large wind turbines are produced from several parts which are prefabricated individually and then bonded. A rotor blade comprises for example two rotor blade shells, the upper shell and the lower shell, which specify the outer shape and thus the fundamental aerodynamic properties of the rotor blade. The rotor blade typically further comprises two webs, for stabilization, which extend in the interior of the rotor blade substantially over the entire length.

For producing such a rotor blade, initially the rotor blade shells and the webs are individually prefabricated, wherein each component in turn can be composed of individual smaller segments. Then, the webs are bonded into one of the rotor blade shells, in most cases, the lower shell. In a further production step, the second rotor blade shell is bonded to the first rotor blade shell and to the webs.

For bonding two parts, or respectively joining partners, initially adhesive is introduced onto one of the joining partners. Due to the extensive bonding areas, a correspondingly high processing time results, which is why slow hardening adhesive with longer pot life, or respectively longer processing times, are used. After applying the adhesive, the second joining partner is pressed into the adhesive. In doing so, a portion of the adhesive is displaced and oozes out at the edge of the bond area between the two joining partners. The joining partners must be held in this position until the bond connection is hardened to the extent that the connection withstands the loads due to weight and movement of the joining partners.

Typically, extensive rework occurs which comprises in particular, tempering the rotor blades for reducing the mechanical tensions within the bond connection that arise due to the fact that the bond connection is under mechanical pressure due to pressing the joining partners together during the hardening. Also, the excess adhesive expressed from the bond area that does not contribute to the stability of the bond connection, is removed and disposed.

It is the object of the invention to specify a method and a device for producing a rotor blade, with which a rotor blade can be quickly and reliably produced.

The objective is solved by a method for producing a rotor blade of a wind turbine from at least a first rotor blade element and a second rotor blade element, that is further developed in that the first rotor blade element and the second rotor blade element are positioned in the desired relative arrangement with respect to each other such that a joint gap remains between the first rotor blade element and the second rotor blade element, wherein adhesive is introduced into the joint gap for joining the first rotor blade element and the second rotor blade element.

In the scope of the invention, a rotor blade element is understood to be a prefabricated component for a rotor blade of a wind turbine that during production of the rotor blade is joined, or respectively bonded, to at least one further rotor blade element, or respectively prefabricated component. This can be for example, a rotor blade shell or a part thereof (shell segment), a web, or respectively main web or a part thereof (web element), a spar, or respectively spar box, or a part thereof or a belt or a part thereof, wherein the designation rotor blade element is not limited to the named examples.

Also in the scope of the invention, the term joint gap is understood to be a space or region which is disposed between the outer surface or top surface of a first rotor blade element that is disposed facing toward a second rotor blade element, and extends to the outer surface or top surface of the second rotor blade element disposed facing the first rotor blade element. Of the other four sides of the space, or respectively the joint gap, which are disposed in particularly parallel in pairs, or substantially parallel, the two relatively longer sides are designated as longitudinal sides, and the two relatively shorter sides are designated as end sides. A joint gap is thus, particularly a flat, narrow and longitudinally extending region, which extends between the top surface of a first rotor blade element and the lower side of a second rotor blade element, from a first end side, or respectively from an end along a longitudinal side, or respectively a longitudinal extension, up to a second end side, or respectively the other end.

With the method according to the invention, the adhesive, which is preferably highly viscous, is applied directly into the joint gap, and can harden there directly. Thereby, it is possible to use adhesive with a very short pot life, or respectively processing time, which can amount roughly to merely 10 minutes. Thereby, one the one hand, the processing time for the bonding of two rotor blade elements is shortened dramatically, and on the other, a plurality of adhesives can be used that were previously unsuitable for use. In particular, with the method according to the invention, single or multi-component and hot or cold hardening adhesives can be used. Suitable adhesives are produced, or respectively offered, and sold by the companies ITW (Plexus-MMA), Hexion, Henkel or Dow/uppc, for example.

Furthermore, the bonding of the two rotor blade elements occurs without external pressure. Therefore, substantially fewer mechanical stresses result in the hardened bond connection. Accordingly, the subsequent tempering can be omitted, or the duration of the tempering can be reduced substantially, which contributes to a further reduction of the total processing time for the production of a rotor blade.

In addition, with the method according to the invention the positioning of the rotor blade elements is facilitated because only the weight of the rotor blade elements is compensated, but no compressive force must be applied.

Preferably the adhesive is applied in the joint gap at a first longitudinal side of the joint gap. In this manner, the flow paths of the adhesive within the joint gap are short, which favors a uniform and rapid distribution of the adhesive without air pockets.

In the scope of the invention it is particularly advantageous when the joint gap is sealed, or will be sealed, along a second longitudinal side, which lies opposite the first longitudinal side. Thereby oozing of adhesive out from the joint gap is largely prevented, so that only as much adhesive is used as is necessary for filling the joint gap.

In the scope of the invention it can be provided that a seal is integrated into the rotor blade element already during the production of a rotor blade element, or that a seal is fastened to the rotor blade element before the positioning of the rotor blade element. In this manner it is possible to seal the joint gap, particularly on one side and along one longitudinal side, simultaneously, or respectively in one step with the positioning of the rotor blade elements. Preferably the rotor blade element to which a seal is or will be fastened is a web or a web element.

Is particularly advantageous when the adhesive is applied into the joint gap, starting at one end of the joint gap, along the longitudinal extension of the joint gap stepwise or proceeding continuously. Hereby air pockets between individual adhesive portions introduced into the joint gap are effectively prevented or at least reduced.

Furthermore it is advantageous if the adhesive is applied into the joint gap by means of an adhesive application apparatus. As a result, it is possible to have a particularly uniform introduction of the adhesive into the joint gap, wherein in addition it is possible to automate the method according to the invention or individual processes in the scope of the method according to the invention.

In particular it can be provided that the introduction of the adhesive into the joint gap is controlled and/or regulated, in that in particular a pressure under which the adhesive is applied, a quantity of adhesive applied per unit time, and/or a movement of an adhesive application apparatus is controlled and/or regulated along the joint gap.

Also in the scope of the method according to the invention it can be provided that the first rotor blade element, which in particular can be a rotor blade shell or a shell segment, is placed on a placement device, particularly an exact fit placement device, and the second rotor blade element, which in particular can be a web or a web element, is positioned, or respectively seated, relative to the first rotor blade element particularly by means of a seating device. Hereby it is advantageously attained that only one of the two rotor blade elements, particularly the lighter of the two rotor blade elements to be joined, must be held against its own weight during the joining. Where necessary, it can be advantageous to secure the other rotor blade element on the placement device against slipping. As a result, in total, a particularly simple construction of the two positioning devices is possible.

The objective is further solved by a manufacturing unit for joining a first rotor blade element and a second rotor blade element during the production of a rotor blade of a wind turbine, having a first positioning device for the first rotor blade element and a second positioning device for the second rotor blade element, the manufacturing unit is further developed in that the first rotor blade element and the second rotor blade element can be positioned in the desired relative arrangement with respect to each other by means of the first positioning device and the second positioning device, such that a joint gap remains between the first rotor blade element and the second rotor blade element, wherein an adhesive application apparatus is provided for introducing adhesive into the joint gap.

The adhesive application apparatus advantageously comprises a nozzle for the adhesive, wherein the adhesive application apparatus and/or the nozzle for the adhesive are designed movable along a longitudinal side of the joint gap.

In addition, a sensor is advantageously provided, wherein by means of the sensor the degree of adhesive filling into the joint gap can be detected or is detected, particularly in the region of the nozzle for the adhesive. For this purpose, for example, an optical sensor can be used which in particular detects the contrast or the degree of gloss between the adhesive and the rotor blade element. Where necessary, it can be advantageous to color the adhesive in order to increase the contrast difference and/or the degree of gloss difference in comparison to the rotor blade elements.

It is preferable if a control or regulating device is provided for the adhesive application apparatus. In particular, it can be provided that by means of the control or regulating device an opening width, or respectively a cross-sectional area of an outlet opening of a nozzle for the adhesive, an adhesive pressure and/or a movement of the nozzle for the adhesive and/or the adhesive application apparatus can be controlled and/or can be regulated, or are controlled and/or are regulated. In particular, the nozzle for the adhesive and/or the adhesive application apparatus moves along the joint gap, wherein the speed of the nozzle for the adhesive or the adhesive application apparatus is controlled or regulated in the movement direction for example. Likewise for example, particularly during the movement along the joint gap, the distance of the nozzle for the adhesive, or respectively the adhesive application apparatus, to the joint gap, or respectively maintaining a target distance, particularly a presettalbe target distance, can be controlled or regulated.

It can also be advantageous to provide an adhesive mixing device for mixing the adhesive, composed of at least two components, particularly as a part of the adhesive application apparatus. Thereby it is made possible that adhesive composed of two or more components is mixed, from the individual components, for example resin and hardener, immediately before application into the joint gap, wherein particularly also adhesive with extremely short pot times in the range of a few minutes can be used.

It is particularly advantageous if the first positioning device is designed as a placement device, particularly for a rotor blade shell or a shell segment, and the second positioning device is designed as a seating device, particularly for a web or a web segment.

The objective is further solved by a rotor blade for a wind turbine composed of at least a first rotor blade element and a second rotor blade element, that is produced, or respectively will be produced, using a method according to the invention and/or using a manufacturing unit according to the invention.

The object of the invention is also solved by a wind turbine with a rotor blade according to the invention.

Figure 2:
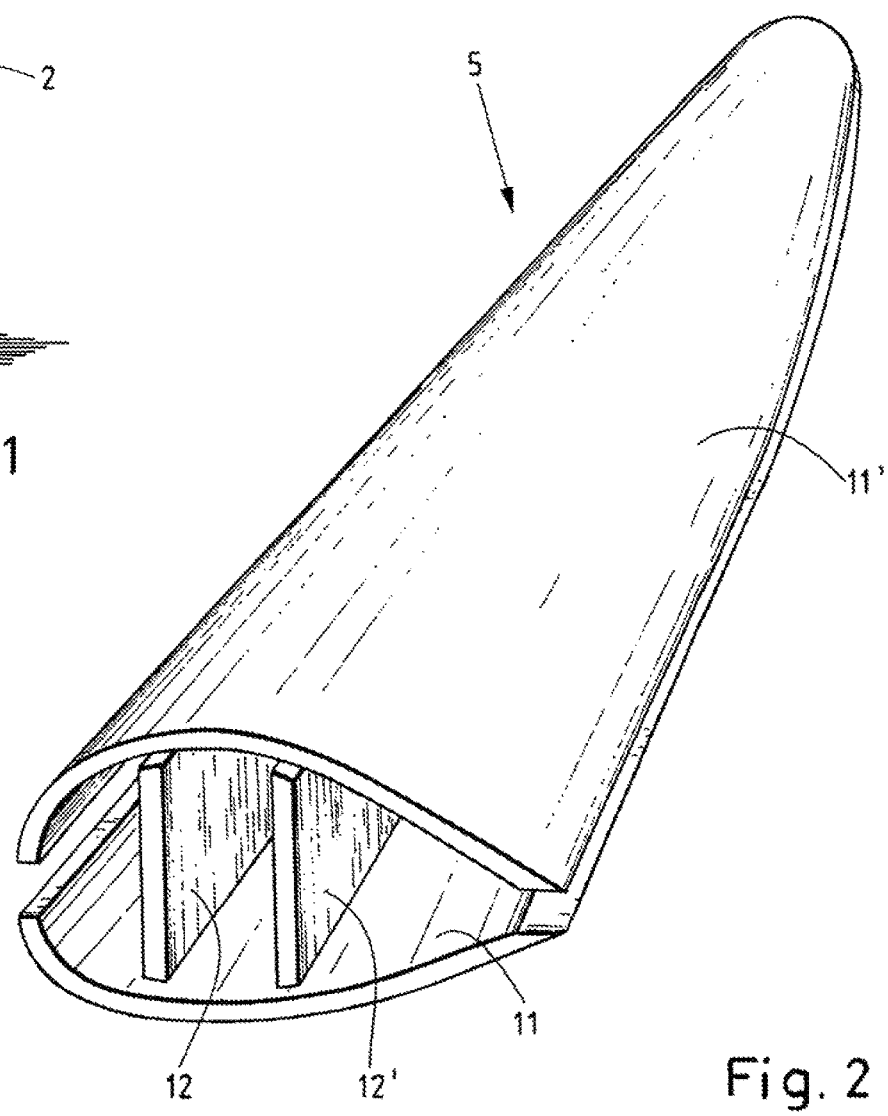

The invention is described below, without restricting the general idea of the invention, using exemplary embodiments with reference to the drawings, whereby we expressly refer to the drawings with regard to the disclosure of all details according to the invention that are not explained in greater detail in the text. In the figures:

FIG. 1 shows a schematic representation of a wind turbine,

FIG. 2 shows a schematic representation of an example rotor blade of a wind turbine, FIG. 3a shows a schematic representation of two rotor blade elements during joining according to the method according to the invention before introducing adhesive into the joint gap, FIG. 3b shows a schematic representation of the rotor blade elements from FIG. 3a during introduction of adhesive into the joint gap, FIG. 4 shows a schematic representation of an example embodiment for sealing the joint gap between a main web and a lower shell by means of a sealing lip integrated into the foot of the web, FIG. 5a shows a schematic representation of an example embodiment for sealing the joint gap between an upper shell and a lower shell at the leading edge of the blade, and FIG. 5b shows a schematic representation of an example embodiment for sealing the joint gap between an upper shell and a lower shell at the trailing edge of the blade.

In the following figures, the same or similar types of elements or corresponding parts are provided with the same reference numbers so that a corresponding re-introduction can be omitted.

FIG. 1 shows a schematic example of a wind turbine 1. The wind turbine 1 comprises a tower 2, at the tip of which a nacelle 3 is disposed. A drive train, disposed mainly in the nacelle and not shown, is driven by means of a rotor 4, which has a total of three rotor blades 5.

FIG. 2 shows the structure of an example rotor blade 5 in a first schematic three-dimensional representation. The rotor blade 5 comprises a lower shell 11, an upper shell 11' and two main webs 12, 12'. The four rotor blade elements are produced individually, for example using fiber reinforced composite materials, and for producing the rotor blade are joined, or respectively bonded, together according to a method according to the invention, or by means of a manufacturing unit according to the invention.

The method according to the invention for producing a rotor blade 5 from separable rotor blade elements is shown schematically in FIGS. 3a and 3b using an example based on bonding the lower shell 11 to a main web 12 of the rotor blade 5 shown in FIG. 2.

The lower shell 11 is placed with the inside thereof facing upward on a first positioning device 15, not shown, and secured against slipping. Then, by means of a second positioning device 16, the main web 12 is brought into the desired final position, or respectively the desired arrangement relative to the lower shell 11. A seal 14 is fastened to the side of the main web facing toward the lower shell, and the seal after alignment, or respectively positioning, of the main web 12, seals the remaining joint gap 13 between the lower shell 11 and the main web 12 on one side. Thus, the main web 12 is held floating by means of the second positioning device 16 just barely above the lower shell 11. The joint gap formed in this manner, is sealed on one side by means of the seal 14, which is formed flexible and resilient for example, and thereby is adapted to the surface of the lower shell 11. In the example shown, the seal is placed at the edge of the joint gap and is fastened, or respectively fixed, there.

With another example embodiment, the seal 14 is composed of a rubber lip which is introduced in the lower side of the main web 12, and is fastened there. In this case, the separate work step for sealing the joint gap is omitted.

However, because the seal 14 itself does not contribute to the stability of the final bond connection, only a portion of the already narrow width of the main web 12 is available for a force-locking connection, or respectively bonding, to the lower shell 11. Therefore, it is particularly advantageous if the seal 14 is applied, or respectively introduced, laterally at the main web 12 and protrudes beyond the lower edge of the main web 12 laterally.

FIG. 4 shows a particularly advantageous design. Here, the main web 12 has web feet 121, which allow a large area bond connection with the upper shell and the lower shell. The web feet taper into thin, slightly angled sealing lips 122 which during seating of the main web contact the inner surface of the upper shell, or respectively the lower shell. The sealing lip 122 projects the lower edge of the web foot 121 beyond the height of the final joint gap 13, and therefore is placed under tension during positioning of the main web 12. Thereby, the flexible sealing lip 122 is lying at the surface of the lower shell 11 and is pressed against the lower shell 11, whereby even small unevennesses of the surface of the lower shell 11 are sealed.

The described design of the web foot 121 which tapers into a thin, preferably narrowing sealing lip 122, has the further advantage that the terminating edge of the web foot 121, or respectively the sealing lip 122, is thin and therefore easy to process. The finishing treatment of this edge, which is necessary, particularly with laminated webs, is thereby significantly simplified, because the sealing lip tapers into either a single layer, or at least a very few layers of laminate, and can be correspondingly cut more simply, or respectively trimmed.

FIG. 3a shows the condition after positioning the main web 12. The lower shell 11 and the main web 12 are brought into the final position thereof and fixed. The joint gap 13 is thereby stabilized and in addition sealed by means of a seal 14 at one of the longitudinal sides thereof. An injection device 20 is disposed at the opposite longitudinal side at one end of the joint gap, and has a nozzle 21 for the adhesive for injecting adhesive into the joint gap 13.

During injection the adhesive flows, particularly caused by a pre-settalbe injection pressure, transverse to the longitudinal extension into the joint gap 13 up to the opposite, sealed longitudinal side. As soon as a section 13' of the joint gap 13 is filled with adhesive, the injection device 20 is displaced or moved along the longitudinal side of the joint gap 13 as shown for example in FIG. 3b based on an advanced stage of the adhesive injection. Thus, a uniform distribution of adhesive is ensured in the entire joint gap 13.

Advantageously, the schematically represented injection device 20 is designed automated or partially automated, in that particularly individual processes or all processes in the context of filling the joint gap with adhesive, or respectively with the introduction of adhesive into the joint gap, are automated. The advantage of automated or partially automated processes consists, among others, in that production conditions are created that are reproducible and can be monitored, and in addition, allows a faster and high quality production of rotor blades.

A process that is easy to automate consists in providing per unit time a pre-settable or adjustable quantity of adhesive under a pre-settalbe and/or adjustable injection pressure. For this purpose, an adhesive pump, particularly an electrical pump for the adhesive, or a nozzle 21 for the adhesive with an adjustable opening width can be used for example.

Also a machine-controlled or automated displacement, or respectively movement, of the injection device 20 can be advantageous, for which purpose a crane device, support device, and/or rail device can be provided, for example, for the injection device. A holder is provided for example for the injection device which advantageously is fastened to one of the positioning devices, for example to the described second positioning device for the main web. In addition, guide rails can be provided for moving the holder along the second positioning device.

Alternatively, the injection device 20 can also comprise an undercarriage, in order to be moved for example on the top side of the lower shell. In this case it is not necessary to provide complex support or rail constructions for the injection device 20. Therefore with an appropriate structural shape of the injection device, which preferably is designed as compact as possible, the use of the joining method according to the invention is also possible even when the bonding area concerned lies within the rotor blade and is not accessible from the outside. In connection with the example above, the upper shell 11' is placed on the first positioning device 15 with the inside facing upward and is secured against slipping for example. Then the assembly composed of the lower shell 11 and the main webs 12, 12' bonded therein, is rotated and positioned relative to the upper shell 12'. Now the four joint gaps between the upper shell 11' and the lower shell 11 and the two main webs 12, 12' are filled with adhesive in the manner described, using an appropriately designed injection device 20, wherein injection device 20 is moved rolling or respectively driving by means of the undercarriage thereof on the inside of the upper shell 11'.

In addition, it can be provided that the components of a multi-component adhesive are mixed automatically or respectively by machine. For this purpose, the injection device 20 can comprise a mixing device for example.

It is advantageous to supply one or more sensors 22 for support, by means of which an actual value or several actual values are recorded or will be determined. For example these values can be: the degree of filling of adhesive in a region of the joint gap, particularly in the region of a nozzle for the adhesive, an injection pressure, a quantity of adhesive injected per unit time, a movement of the injection device along the joint gap and/or at least one property of the injected adhesive, in particular a mixture ratio of individual components and/or viscosity. The recorded or determined actual values, or respectively parameters, can be provided to the operator(s), for example displayed.

Further automation of the method, or respectively the manufacturing unit, is possible in that a control and/or regulating device is provided, by means of which one or more automated processes, is/are controlled or regulated, in particular based on at least one pre-settable target value and/or based on at least one actual value recorded by means of the sensor 22.

Depending on the degree of automation, using the method according to the invention, or respectively the manufacturing unit according to the invention, at least 50% of the total processing time, at least 50% of the adhesive and 50% of the personnel can be saved compared to a conventional bonding of a web to a rotor blade shell. In addition, all waste is eliminated because there is no excess adhesive to dispose of. In addition, under certain circumstances, the tempering can be eliminated completely in the rework.

The method according to the invention can also be used for joining the lower shell 11 and the upper shell of 11' at the leading edge of the blade, or respectively at the trailing edge of the blade.

FIG. 5*a* and FIG. 5*b* show an example of a seal of the joint gap 13 between the lower shell and the upper shell 11, 11' at the leading edge of the blade, or respectively the trailing edge of the blade. The adhesive is applied from the outside of the rotor blade 5 into the joint gap 13. A thin seal 14, which is composed for example of a glass-fiber reinforced plastic (GRP), is bonded beforehand from the inside in front of the joint gap 13 and prevents excessive adhesive from flowing into the inside of the rotor blade 5.

Thereby it is prevented that the rotor blade 5 is unnecessarily heavy, and that with exothermic hardening of the adhesive thermal cracks form in excessive adhesive in the interior of the rotor blade 5, which in the worst case continue up into the laminate of the lower shell or upper shell.

All named characteristics, including those taken from the drawings alone are considered alone and in combination as important to the invention.

REFERENCE LIST

1 wind turbine
2 tower
3 nacelle
4 rotor
5 rotor blade
11 lower shell
11' upper shell
12, 12' web
121 web foot
122 sealing lip
13 joint gap
13' joint gap with adhesive
14 seal
20 injection device
21 nozzle for the adhesive

The invention claimed is:

1. A method for producing a rotor blade (5) of a wind turbine (1), comprising the steps of:
   fastening a seal (14, 122) to a second rotor blade element (12, 12') during production of the second rotor blade element (12, 12');
   positioning a first rotor blade element (11, 11') and the second rotor blade element (12, 12') in a desired relative arrangement with respect to each other such that a joint gap (13) remains between the first rotor blade element (11, 11') and the second rotor blade element (12, 12'), wherein the seal (14, 122) is fastened to the second rotor blade element (12, 12') before the second rotor blade element (12, 12') is positioned, and
   joining the first rotor blade element (11, 11') and the second rotor blade element (12, 12') by introducing an adhesive in a controlled manner into the joint gap (13), wherein the introduction of the adhesive into the joint gap (13) is regulated by controlling at least one of an adhesive quantity that is introduced per unit time and a movement of an adhesive application apparatus (20) along the joint gap (13), wherein the joint gap (13) is sealed along a second longitudinal side which extends opposite a first longitudinal side.

2. The method according to claim 1, wherein the adhesive is introduced into the joint gap (13) at the first longitudinal side of the joint gap (13).

3. The method according to claim 1, wherein the adhesive is introduced starting at one end of the joint gap (13) along a longitudinal extension of the joint gap (13) stepwise or continuously proceeding in the joint gap (13).

4. A wind turbine (1), comprising:
   a tower (2);
   a nacelle (3) disposed at a tip of the tower (2); and
   a rotor blade (5) according to claim 1, wherein the rotor blade (5) is attached to the nacelle (3).

5. A manufacturing unit for joining a first rotor blade element (11, 11') and a second rotor blade element (12, 12') during production of a rotor blade (5) of a wind turbine (1), the manufacturing unit comprising:
   a first positioning device (15) that receives the first rotor blade element (11, 11');
   a second positioning device (16) that positions the second rotor blade element (12, 12') with respect to the first rotor blade element (11, 11') such that a gap (13) remains therebetween, wherein a seal (14, 122) is fastened to the second rotor blade element (12, 12') during production of the second rotor blade element (12, 12') and before the second positioning device (16) positions the second rotor blade element (12, 12');
   an adhesive application apparatus (20) disposed at a first longitudinal side at one end of the joint gap (13), wherein the adhesive application apparatus (20) introduces an adhesive into the joint gap (13); and a sensor (22) that senses a filling degree of the adhesive in the joint gap (13), wherein the adhesive is introduced in a controlled manner into the joint gap (13), and wherein the sensor senses the filling degree of the adhesive in the joint gap (13) near a nozzle (21) for the adhesive, wherein the joint gap (13) is sealed along a second longitudinal side which extends opposite the first longitudinal side.

6. The manufacturing unit according to claim 5, wherein the adhesive application apparatus (20) comprises the nozzle (21) for the adhesive, and wherein at least one of the adhesive application apparatus (20) and the nozzle (21) for the adhesive are movable along the first longitudinal side of the joint gap (13).

7. The manufacturing unit according to claim 5, further comprising:

a control device for the adhesive application apparatus (20) that regulates at least one of a cross sectional area of an outlet opening of the nozzle (21) for the adhesive, an adhesive pressure, a movement of the nozzle (21) for the adhesive along the joint gap (13), and movement of the adhesive application apparatus (20) along the joint gap (13).

8. The manufacturing unit according to claim 5, wherein the adhesive application apparatus (20) mixes adhesive composed of at least two components.

* * * * *